(12) United States Patent
Bratkovski et al.

(10) Patent No.: US 8,600,203 B2
(45) Date of Patent: Dec. 3, 2013

(54) CYLINDRICAL RESONATORS FOR OPTICAL SIGNAL ROUTING

(75) Inventors: Alexandre M. Bratkovski, Mountain View, CA (US); Terrel Morris, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 398 days.

(21) Appl. No.: 12/995,881

(22) PCT Filed: Jun. 9, 2008

(86) PCT No.: PCT/US2008/066258
§ 371 (c)(1),
(2), (4) Date: Dec. 2, 2010

(87) PCT Pub. No.: WO2009/151438
PCT Pub. Date: Dec. 17, 2009

(65) Prior Publication Data
US 2011/0075967 A1  Mar. 31, 2011

(51) Int. Cl.
*G02B 6/26* (2006.01)

(52) U.S. Cl.
USPC .................. 385/17; 385/16; 385/39; 385/50

(58) Field of Classification Search
None
See application file for complete search history.

(56) References Cited

U.S. PATENT DOCUMENTS

| | | |
|---|---|---|
| 2,922,917 A | 1/1960 | Kompfner |
| 3,437,875 A | 4/1969 | Farney |
| 4,338,570 A | 7/1982 | Kurnit |
| 4,439,860 A | 3/1984 | Kurnit |
| 4,682,076 A | 7/1987 | Kageyama |
| 5,635,797 A | 6/1997 | Kitakaze |
| 6,195,187 B1 | 2/2001 | Soref |
| 6,222,964 B1 * | 4/2001 | Sadot et al. ............ 385/40 |
| 6,580,851 B1 | 6/2003 | Vahala et al. |
| 6,751,377 B2 * | 6/2004 | Baumann et al. ........... 385/32 |
| 6,859,304 B2 | 2/2005 | Miller |
| 7,062,118 B2 * | 6/2006 | Chiu et al. ............. 385/15 |
| 7,062,131 B2 * | 6/2006 | Ilchenko ............ 385/50 |
| 7,072,531 B2 | 7/2006 | Djordjev |
| 7,184,624 B1 * | 2/2007 | Matsko et al. ............ 385/30 |
| 7,245,801 B2 | 7/2007 | Boyd |
| 7,286,734 B2 * | 10/2007 | Montgomery et al. ......... 385/50 |
| 7,400,797 B2 * | 7/2008 | Bhagavatula et al. ......... 385/32 |
| 7,477,812 B2 * | 1/2009 | Nielson et al. ............. 385/16 |
| 2003/0118270 A1 | 6/2003 | Miyano et al. |
| 2003/0152313 A1 | 8/2003 | Tapalian |
| 2003/0219193 A1 | 11/2003 | Litvin |

FOREIGN PATENT DOCUMENTS

| | | |
|---|---|---|
| EP | 1717614 | 11/2006 |
| JP | 2001318246 | 11/2001 |
| JP | 2005031703 | 2/2005 |
| JP | 2005507089 | 3/2005 |
| JP | 2006105796 | 4/2006 |
| JP | 2006309237 | 11/2006 |
| WO | WO-03001260 | 1/2003 |

* cited by examiner

Primary Examiner — Mike Stahl

(57) ABSTRACT

A system for routing optical signals includes a waveguide array and a cylindrical resonator lying across the waveguide array, the cylindrical resonator having independently controllable tangential interfaces with each of the waveguides within the waveguide array. A method of selectively routing an optical signal between waveguides includes selecting a optical signal to route; determining the desired path the optical signal; tuning a first controllable interface between a cylindrical resonator and a source waveguide to extract the optical signal from the source waveguide; and tuning a second independently controllable interface between the cylindrical resonator and a destination waveguide to deposit the optical signal into the destination waveguide.

20 Claims, 10 Drawing Sheets

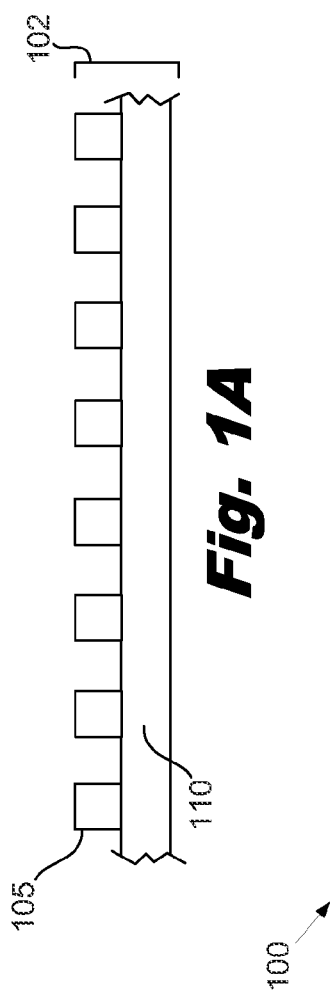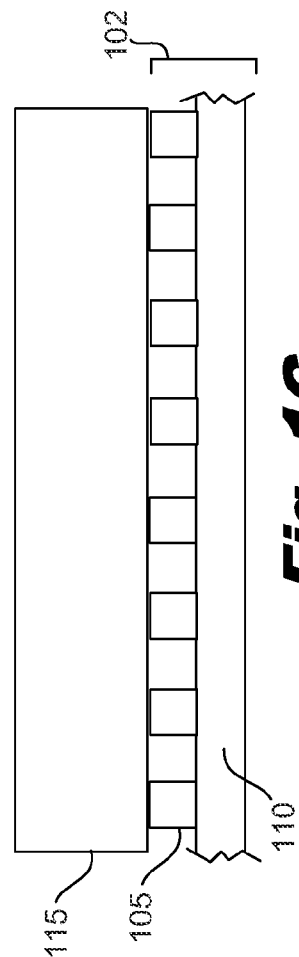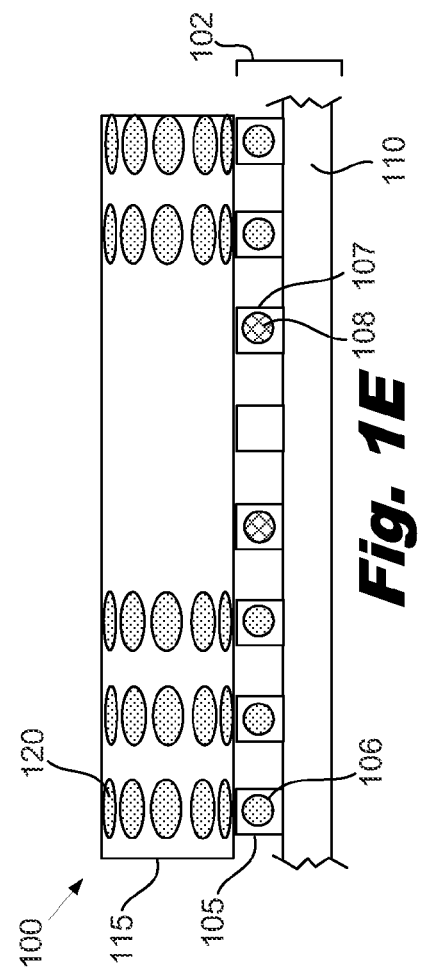

CYLINDRICAL RESONATORS FOR OPTICAL SIGNAL ROUTING

BACKGROUND

Light beams or optical signals are frequently used to transmit digital data. For example, optical signals are used in fiber optic systems for long-distance telephony and Internet communication. Additionally, optical signals are frequently used to transmit data between electronic components on a single circuit board or between electronic components on adjacent or nearby circuit boards.

Systems utilizing optical communication often rely upon the precise manipulation of optical energy, usually in the form of a light beam, to accomplish a desired task. This is especially true in systems utilizing light for high-speed, low-energy communication between multiple nodes. In such systems, optical data signals typically travel through one or more waveguides which are connected to the various nodes.

To efficiently pass information through the system, it is often necessary to combine, separate, and route various optical signals. For example, it may be desirable to extract a specific optical signal from a first waveguide and selectively route it into any one of a number of other waveguides. This can be accomplished by converting the optical signal into an electrical signal, then using a laser or other optical source to reconstruct the optical signal in the desired waveguide. This technique has a key limitation: the electronic circuits limit the maximum bandwidth of the signal.

A second approach uses an optical switching device to transfer the optical signal from one waveguide to another waveguide. Optical switches may operate by mechanical means, such as physically shifting an optical fiber such that it drives one or more alternative fibers. A mechanical switch is relatively slow and can only shift the optical signal into a small number of alternative fibers. Optical switches may also use electro-optic effects, magneto-optic effects, or other methods. These optical switches can be much faster than mechanically actuated switches but are still limited in their ability to route optical signals to a large number of alternative waveguides without complex architectures and multiple switching elements. These complex architectures can be expensive to manufacture, fragile, and require a relatively large area within the photonic device.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIGS. 1A through 1F are diagrams illustrating the operating principles of an illustrative optical routing system, according to one embodiment of principles described herein.

Throughout the drawings, identical reference numbers designate similar, but not necessarily identical, elements.

DETAILED DESCRIPTION

Figure 2A:
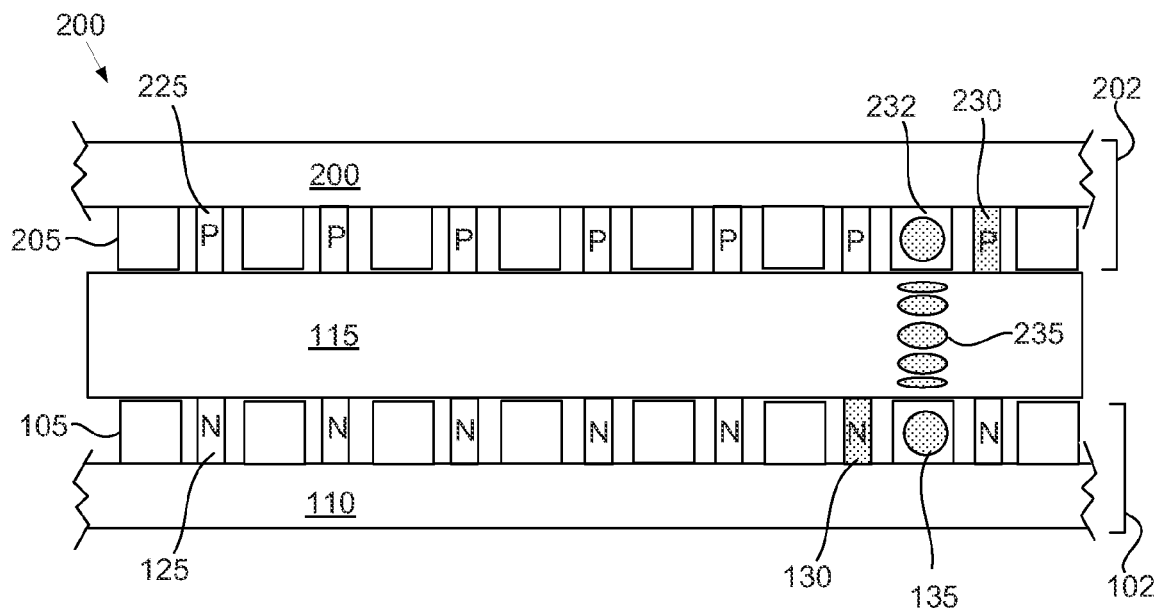
FIGS. 2A through 2D are diagrams showing various embodiments of illustrative optical routing systems, according to one embodiment of principles described herein.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Optical resonators are used to selectively filter, switch, or modulate light beams. In such a system, a resonator is typically formed by an optical waveguide in a closed loop that is optically coupled to another optical waveguide arranged tangential to the loop. The resonators can be selectively optically coupled to the tangential waveguide by tuning the resonator's resonant frequency to match the frequency of optical energy within the tangential waveguide. When this occurs, optical energy in the tangential waveguide of the tuned frequency will be coupled or transferred into the looped waveguide of the resonator.

For example, in wavelength division multiplexing, the optical energy transmitted through the tangential waveguide can be made up of a plurality of different wavelength bands or "lines". Each line may be narrow, on the order of 1 MHz to 1 GHz in width. Each different line can serve as a carrier for a separate data signal. By tuning the resonator's resonant frequency to a specific wavelength, optical energy within a particular line can be extracted from the tangential waveguide. This optical energy can then be modulated, detected, routed into a new waveguide, or used in other similar operations.

FIGS. 1A through 1F are diagrams illustrating the operating principles of an illustrative optical routing system. FIG. 1A shows an end view of a waveguide array (102) that is made up of parallel ridge waveguides (105) spaced across a substrate (110), FIG. 1B shows a side view of the same waveguide array (102). Each waveguide (105) is assigned or configured to carry one or more frequencies of optical energy. Data signals can be encoded into the various frequencies of optical energy contained within the waveguides (105). As discussed above, it can be desirable to combine optical signals, transfer an optical signal out of a first waveguide and into a second wave guide, de-multiplex signals, and perform other such operations.

FIGS. 1C and 1D show one illustrative embodiment of an optical routing system (100). In this embodiment, a cylindrical resonator (115) is positioned on top of the waveguide array (102). The cylindrical resonator (115) is in a cross-bar configuration where the cylinder (115) spans a number of waveguides (105). The cylindrical resonator (115) has a resonant frequency that can be selectively tuned by, for example, controlling the temperature, mechanical stress, electrical field or other parameter applied to the resonator (115).

Typically, there is a slight gap between the cylinder (115) and the upper surfaces of the waveguides (105). An evanescent optical field of light traveling in any of the waveguides (105) will cross this gap. Consequently, a specific wavelength of light traveling within a waveguide (105) can be transferred across this gap and into the cylindrical resonator (115) when the cylindrical resonator (115) has its resonant frequency tuned to that wavelength of light. Light of different wavelengths is unaffected by the cylindrical resonator (115) and continues through the waveguide (105).

FIGS. 1E and 1F illustrate this selective optical coupling between the waveguides (105, 107) and the cylindrical resonator (115). As previously discussed, the waveguides (105, 107) may contain one or more wavelengths of light. When the cylindrical resonator (115) has its resonant frequency tuned to specific wavelength (or frequency) of light, this light is coupled into the cylindrical resonator (115). For example, a first waveguide (105) contains a target wavelength of light (106) to which the cylindrical resonator (115) is tuned. A portion of this target wavelength of light is coupled into the cylindrical resonator (115) and is contained within the cylindrical resonator (115) as whispering gallery modes (120). A second waveguide (107) contains a different wavelength of light (108) which is not coupled into the cylindrical resonator (115) until the resonator (115) is tuned to that wavelength. Various mechanisms for tuning of the cylindrical resonator are described below.

Whispering gallery modes (120) occur when particular resonant frequencies of light are confined in a cylindrical or spherical volume a that has an index of refraction greater than the medium surrounding it. At these wavelengths, the light undergoes total internal reflection at the volume surface and becomes trapped within the volume for timescales on the order of nanoseconds. FIG. 1F shows a cross-sectional diagram of the optical routing system (100) shown in FIG. 1E. Whispering gallery modes (120) are illustrated as circles around the perimeter of the cylindrical resonator in FIG. 1F and ovals in FIG. 1E. These whispering gallery modes (120) have a tendency to spread in dimensions that the resonator does not geometrically restrain. For example, in a cylindrical resonator, the modes (120) are constrained in two dimensions by circumference of the cylinder, but may spread axially along the cylinder length.

FIGS. 2A through 2D are diagrams showing various embodiments of illustrative optical routing systems (200, 290, 295, 298) using these principles. FIG. 2A shows an optical routing system (200) that comprises an upper waveguide array (202), a lower waveguide array (102), and a cylindrical resonator (115) sandwiched between the two waveguide arrays. The lower waveguide array (102) comprises a number of lower waveguides (105) so evenly spaced across a substrate (110). In between the lower waveguides (105), a number of N-doped electrodes (125) have been formed. The upper waveguide array (202) similarly contains a number of upper waveguides (205) evenly spaced across a substrate (200). A number of P-doped electrodes (225) have been formed in the spaces between the upper waveguides (205).

Throughout the specification, reference is made to P-doped and N-doped electrodes. N-doped electrodes are formed by adding impurity atoms to a semiconductor material to increase the number of free negative charge carriers. Similarly, a P-doped electrode is formed by adding impurity atoms to a semiconductor to increase the number of free positive charge carriers. It will be recognized by those of skill in the art that in many instances the positions of complementary pairs of p-doped and n-doped electrodes can be interchanged and that the p-doped or n-doped designations are arbitrary. In some circumstances, other electrode types may be viable, such as metallic leads.

The optical routing system (200) can be used to route optical energy from a source waveguide (135) to a destination waveguide (232). To couple a portion of the cylindrical resonator (115) with the source waveguide (135), a pair of electrodes (130, 230) is energized to inject charge carriers into the cylindrical resonator (115). The charge carriers alter the resonant frequency of a portion of the cylindrical resonator (115) such that it is tuned to the specific light frequency that is desired to be extracted from the source waveguide (135). Optical energy of that specific wavelength is then coupled into this optical waveguide (115) and is contained in a number of whispering gallery modes (235). According to one exemplary embodiment, injecting charge carriers to couple the source waveguide (135) also tunes the interface between the cylindrical resonator (115) and the destination waveguide (232), which accepts the optical energy contained within the cylindrical resonator (115). This optical energy then travels through the length of the destination waveguide (232).

In some situations, FIG. 2A represents an idealized representation of the whispering gallery modes (235). As mentioned above, the whispering gallery modes (235) naturally spread axially along the length of the cylindrical resonator (115). As described below, the spreading of the whispering gallery modes (235) can be undesirable.

Figure 2B:
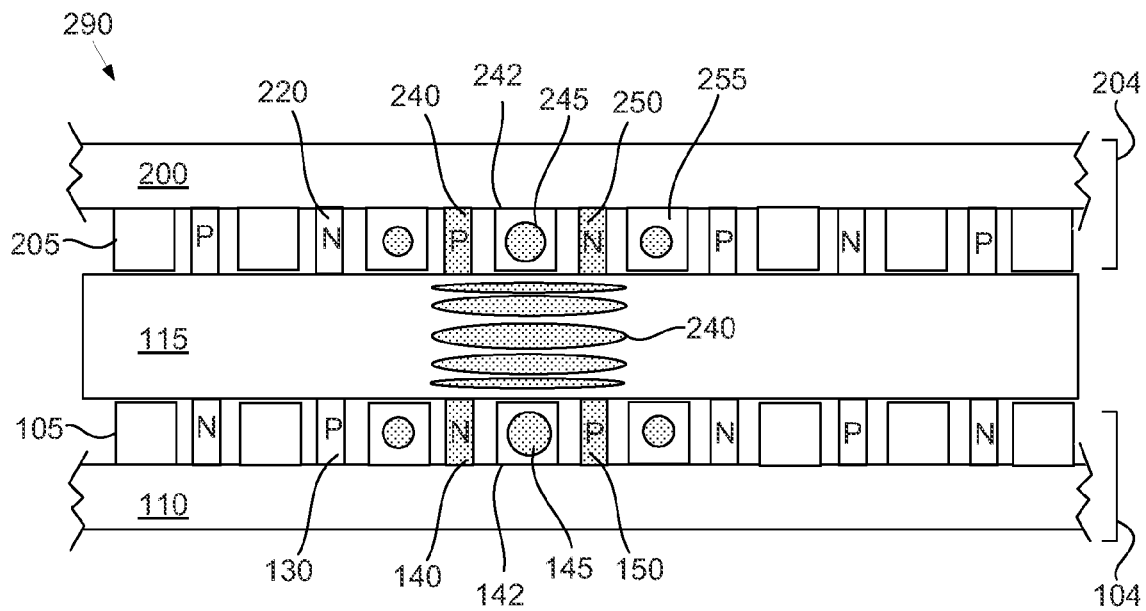

FIG. 2B illustrates one exemplary embodiment of an optical routing system (290) that has a similar geometric arrangement as that illustrated in FIG. 2A. The optical routing system (290) again comprises a lower waveguide array (104) and an upper waveguide array (204). The cylindrical resonator (115) is sandwiched between the upper waveguide array (204) and lower waveguide array (104). In this exemplary embodiment, the doping of the electrodes is alternated across a single waveguide array such that an N-doped electrode is in a first space between waveguides and a P-doped electrode (140) is in the space between the next pair of waveguides.

In this example, the cylindrical resonator (115) is tuned to the desired wavelength by energizing a pair of electrodes (240, 250) in the upper waveguide array (204) and a pair of electrodes (140, 150) in the lower waveguide array (104). Energizing the electrode pairs (140, 150; 240, 250) injects charge carriers into a portion of the cylindrical resonator (115). This alters the index of refraction of the cylindrical resonator (115) by charge carrier scattering of light within the cylindrical resonator (115). The change in index of refraction is proportional to the density of charge carriers within the cylinder (115).

By strategically placing the electrodes within the optical routing system (290), the charge carrier density can be localized within a desired portion of the cylindrical resonator (115). The optical energy (145) is then coupled across the interface between the source waveguide (142) and the cylindrical resonator (115). This optical energy forms whispering gallery modes (240) that are contained within the cylindrical resonator (115). As shown in the illustration, these whispering gallery modes (240) spread such that they are no longer coupled to a single destination waveguide (242) but are received by a number of secondary waveguides (255). In some cases, the spreading of the whispering gallery modes can be desirable, but in most instances it is desirable to precisely route an optical frequency from a single source waveguide to a designated destination waveguide.

Figure 2C:
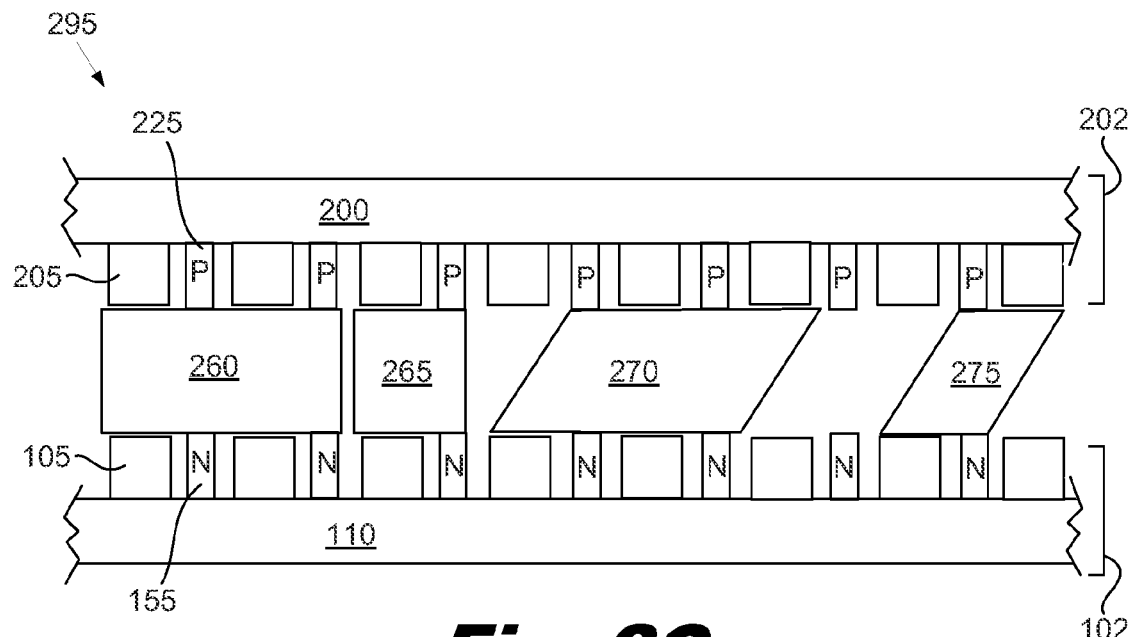

FIG. 2C illustrates cylindrical resonators (260, 265, 270, 275) having various geometries designed to more precisely contain the whispering gallery modes. The illustrative optical routing system (295) again comprises an upper waveguide array (202) and a lower waveguide array (102) with various geometries of cylindrical resonators sandwiched between the two waveguide arrays. As previously discussed, the waveguide array is comprised of a number of waveguides (105, 205) formed on the substrate (110, 200). A number of electrodes (155, 225) are disposed between the waveguides (105, 205). Various cylindrical resonators (260, 265, 270, 275) are in electrical contact with two or more of the electrodes. These electrodes inject charge carriers into the cylindrical resonators (260, 265, 270, 275). These charge carriers alter the index of refraction and adjust the coupling between the various waveguides and the cylindrical resonators.

According to one exemplary embodiment, the length of a cylindrical resonator can be varied to limit the amount of spreading in the whispering gallery modes. For example, a first cylindrical resonator (260) is in contact with four waveguides and four electrodes. This limits the dispersion of optical energy contained within the cylindrical waveguide (260). A second cylindrical resonator (265) is shorter and is in electrical contact with only two electrodes and in optical proximity with only two waveguides. Thus, the second cylindrical resonator (265) allows only for coupling between two waveguides. To route optical energy to waveguides that are not directly above the source waveguide, it could be desirable to form a cylindrical resonator (270) with a parallelogram cross-section. This parallelogram cross-section optical resonator (270) is in contact with four electrodes and in optical proximity to four waveguides. The length of a parallelogram optical resonator can be shortened as shown by the shorter parallelogram cross-section cylindrical waveguide (275), which is in contact with a single pair of electrodes and routes optical energy from a source waveguide diagonally to a single destination waveguide.

A variety of other geometric techniques can be used to contain the lateral spreading of whispering gallery modes. By way of example and not limitation, the cylindrical resonator could be made up of a number of different materials that segment the resonator and direct the optical energy from the source waveguide to the desired destination waveguide. Additionally, because the whispering gallery modes are primarily located at the perimeter of the cylindrical resonator a number of surface features, such as grooves, indentations, or bands, could be used to direct the optical energy.

Figure 2D:
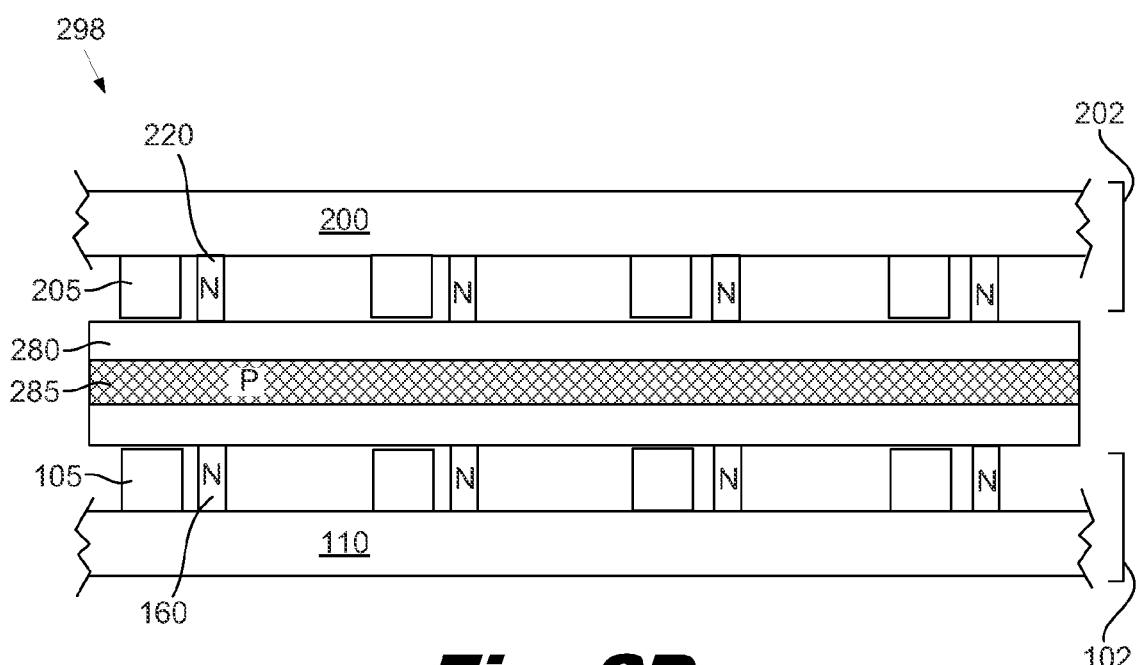

FIG. 2D shows an alternative electrode configuration for controlling the interfaces between the individual waveguides and the cylindrical resonator (115). The core (285) of the cylindrical resonator (280) is P-doped and serves as a first electrode. Various N-doped electrodes (160, 220) are contained within the upper array (202) and the lower array (102). The electrodes and waveguide pairs are spaced apart to minimize cross coupling between adjacent waveguides due to lateral spreading of whispering gallery modes. According to one exemplary embodiment, the electrode arrangement can lead to highly localized charge density at the individual interfaces.

While altering the geometry of the resonator or controlling the charge carrier density can limit the spreading of the whispering gallery modes and precisely direct the optical energy, it can limit the flexibility of the optical routing system. Ideally, the optical routing system would be able to extract optical energy from any waveguide and direct it to any other waveguide. As described below, the use of one or more cylindrical resonators with a helical groove around its perimeter can allow an optical signal to be routed with the desired flexibility.

Figure 3:
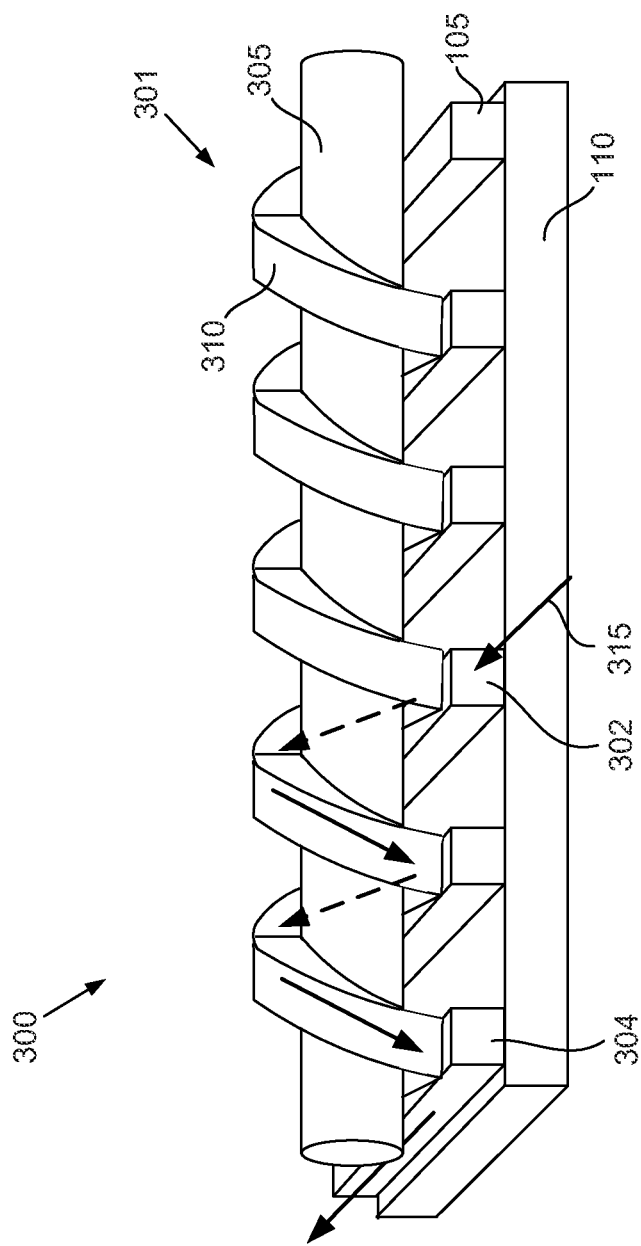
FIG. 3 is a diagram of an illustrative cylindrical resonator which forms a helix, according to one embodiment of principles described herein.

FIG. 3 is a diagram of an optical routing system (300) using a left-hand helical resonator (301). In this illustrative embodiment, the optical routing system (300) comprises a waveguide array (105) supporting a left-hand helical resonator (301). The helical resonator (301) is a special case of the cylindrical resonators previously described and follows the same general operating principles.

According to one exemplary embodiment, the left-hand helical resonator (301) comprises a core (305) which supports a left-handed helix (310) that winds around the core (305). The helix (310) interfaces with multiple waveguides (105) and selectively routes optical energy received from one waveguide to a large number of other waveguides while simultaneously limiting undesirable spreading of the whispering gallery modes. In the illustrated embodiment, incoming light (315) passes through source waveguide (302) and is coupled into the helix (310). To effectively couple incoming light (315) across the interface, the adjoining portion of the helix (310) should be mode-matched or tuned to the frequency of light in the source waveguide (302). The optical energy travels through the helix (310) until it reaches the destination waveguide (304). The optical energy is then coupled into the destination waveguide (304) and travels along the length of the destination waveguide (304).

As previously discussed, resonant frequencies of portions of the helical resonator (301) must be altered to achieve the desired amount of coupling between both the source waveguide (302) and the destination waveguide (304). This resonant frequency can be tuned to extract a specific frequency of optical energy from the source waveguide that is then conveyed to a given destination waveguide. In addition to charge carrier injection, a number of other techniques are discussed below for mode-matching or tuning the helix (310) to extract light from a desired waveguide.

This optical routing system (300) can be particularly advantageous in wavelength division multiplexing applications where multiple optical carrier signals may be present a single optical fiber. The helical resonator can be tuned to extract a single one of these wavelengths and pass it to a separate destination waveguide. This transferred optical energy may be combined with other optical energy traveling through the destination waveguide. Separate portions of the helical resonator can be tuned to match different optical frequencies within various waveguides that are received by the helix and routed to one or more destination waveguides. This optical routing can accomplish a number of objectives including routing a single incoming optical signal into multiple outgoing optical signals, switching the optical signal to travel through an alternate waveguide to its destination, multiplexing, de-multiplexing, or other similar operations.

Figure 4A:
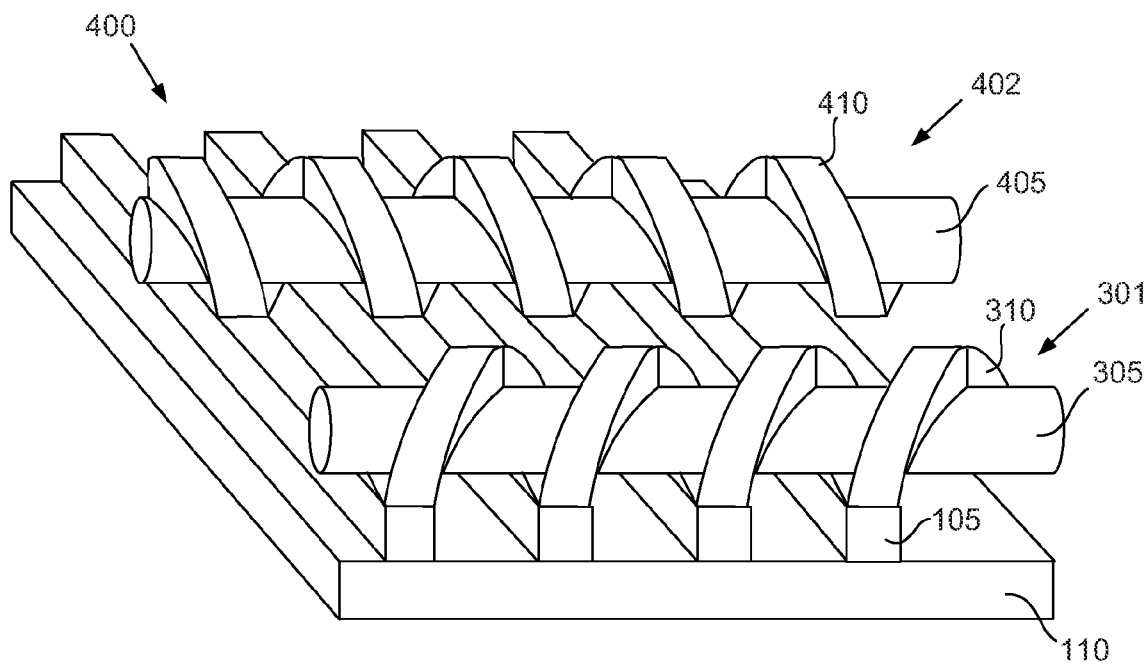
FIGS. 4A and 4B are diagrams of illustrative helical resonators used within an optical routing system, according to one exemplary embodiment of principles described herein.
Figure 4B:
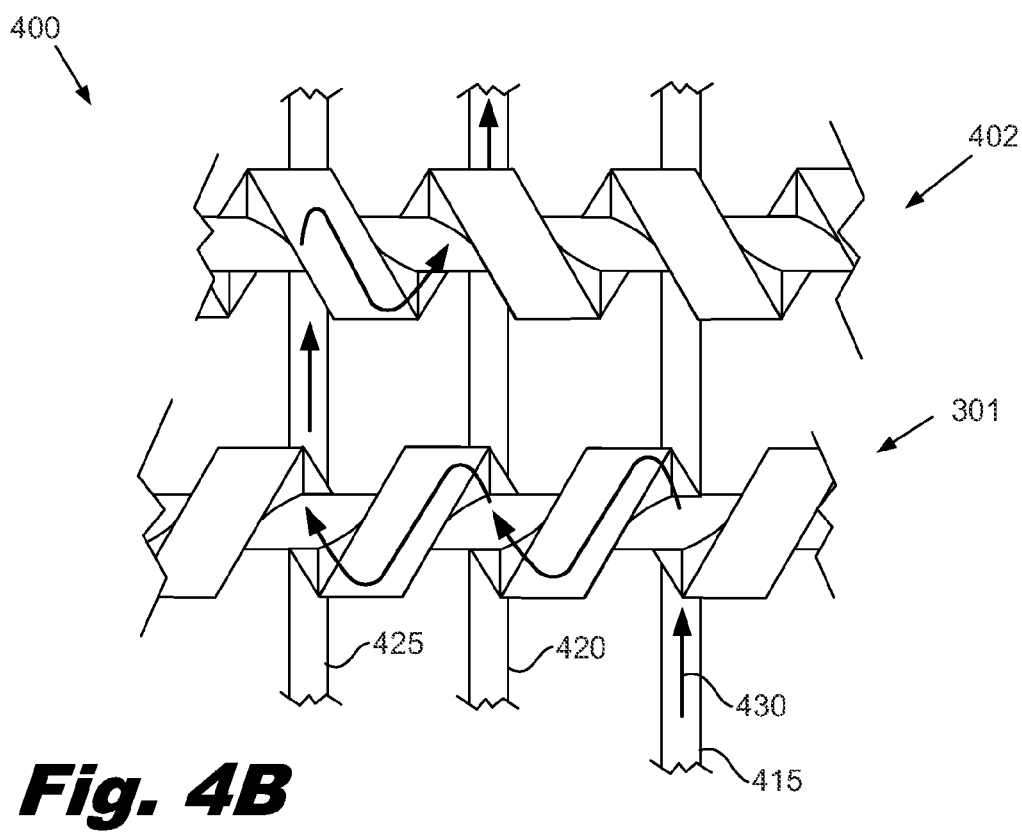

FIGS. 4A and 4B are diagrams of illustrative helical resonators so (402, 301) used within an optical routing system (400). In this exemplary embodiment, the waveguide array comprises a plurality of waveguides (105) formed on a substrate (110). Resting above the waveguides (105) are a left-handed helical resonator (301) and a right-handed resonator (402). The left-handed helical resonator comprises a core (305) and a left helix (310). The right handed helical resonator (402) comprises a core (405) and a right helix (410). The various waveguides (105) are in close proximity to the outer perimeter of the helices (310, 410). By injecting charge carriers via electrodes, magneto-optic effects, or through various other electrically controllable means, the resonant frequency at the interface between the outer perimeter of the helix and any waveguide can be tuned to specific wavelengths. In some embodiments, multiple wavelengths of light can be simultaneously routed from different source waveguides to one or more destination waveguides.

FIG. 4B shows one illustrative method for using a pair of helices to reroute an optical signal using a number of right angled turns to reach a destination. The source waveguide (415) contains the incoming optical energy (430). A portion of the left-handed helical resonator (301) is coupled to the source waveguide (415) and accepts the incoming optical energy. The incoming optical energy (430) passes through the left helix and then enters a transferring waveguide (425). The transferring waveguide (425) conveys the optical energy to the right handed helical resonator (402) where it enters the right-handed helix (410). The right-handed helix (410) conveys the optical energy to the destination waveguide (420). The optical energy then enters the destination waveguide (420) and is conveyed along this waveguide to its next destination.

Figure 5:
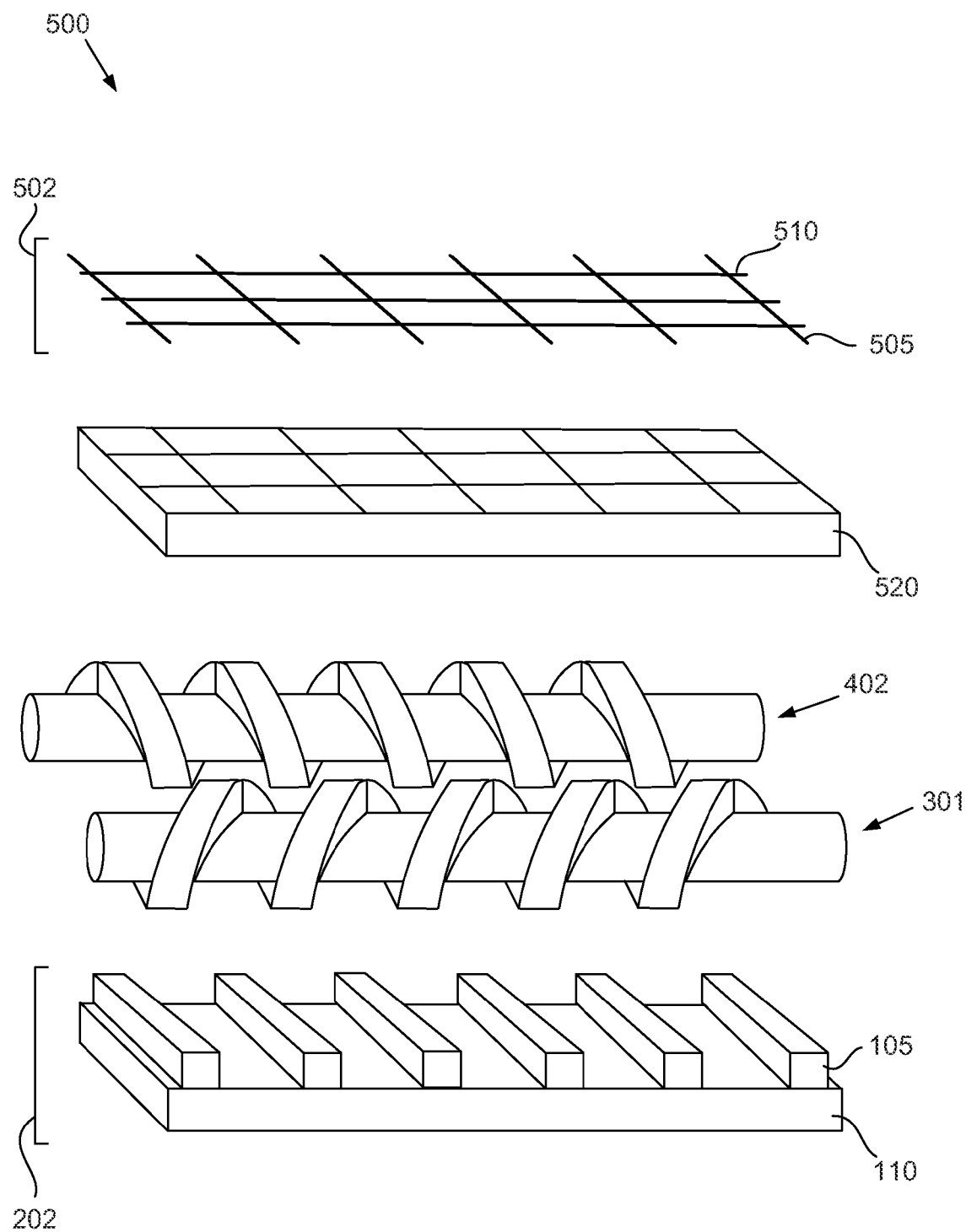
FIG. 5 is a diagram showing various illustrative components of an optical routing system, according to one embodiment of principles described herein.

FIG. 5 is an exploded view of various illustrative components of an optical routing system (500). According to one exemplary embodiment, the optical routing system (500) comprises: address lines (502), an electrode array (520), right-handed helical resonator (402), a left-handed helical resonator (301), and a waveguide array (202). As discussed above, the waveguide array (202) comprises a number parallel waveguides (105) disposed on a substrate (110). The geometry of the waveguide array (202) is not limited to parallel ridge waveguides, but may be adapted to meet the requirements of various applications. The helical resonators (402, 301) rest above the waveguides (105) such that the helical resonators (402, 301) can be selectively coupled to the waveguides (105).

In this illustrated embodiment, the electrode array (520) rests above the helical resonators and is in electrical contact with the perimeter of the helices, such that charge carriers can be injected to control the resonant frequencies of portions of the helical resonators (402, 301). To selectively inject charge carriers, a number of address lines (502) allow the various electrodes within the electrode array (520) to be selectively actuated. According to one exemplary embodiment, the address lines (502) comprise a number of row lines (510) and a number of column lines (505). These row and column lines (505, 510) could be analogous to word and bit lines in a memory array which allow access to individual elements within an array. In an alternative embodiment, the address lines (502) may underlie the waveguide structures. The address lines (502) allow an X-Y point to be selected and biased to shift the resonance of a helical resonator (402, 301) at a particular interface with a waveguide (105).

Figure 6A:
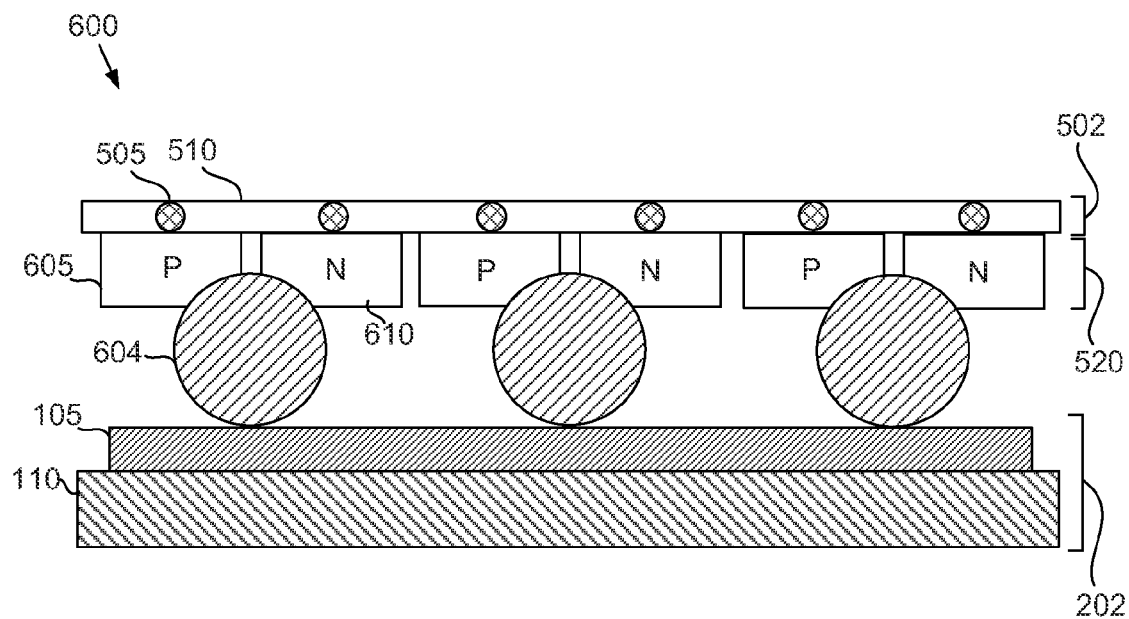
FIGS. 6A and 6B are diagrams showing illustrative electrode configurations for an optical routing system, according to one embodiment of principles described herein.
Figure 6B:
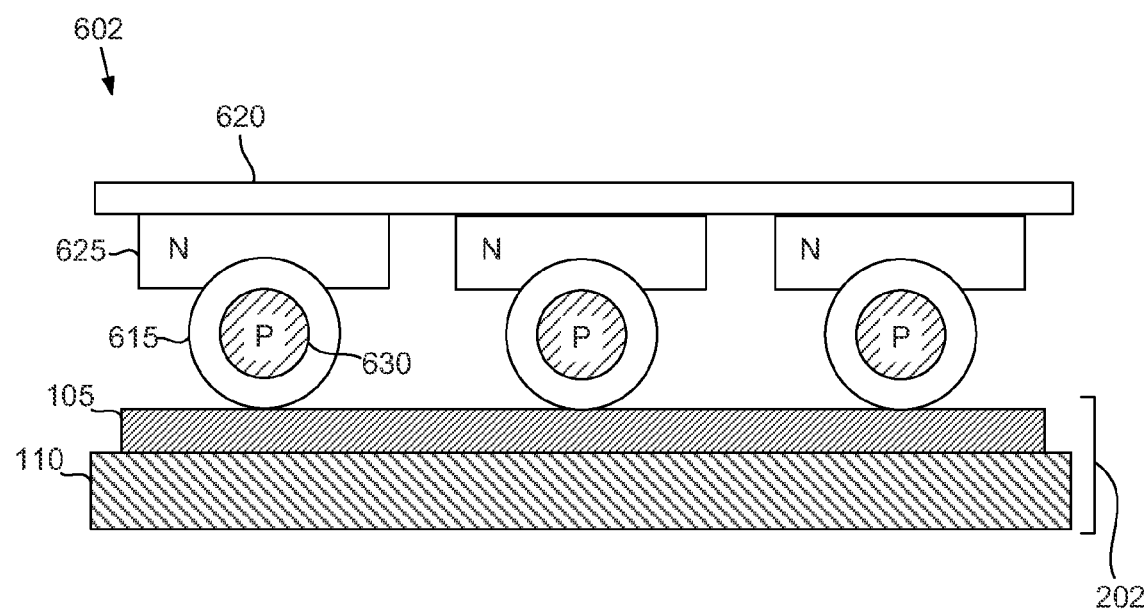

FIGS. 5A and 6B are illustrative diagrams showing various electrode configurations for optical routing systems (600, 602). According to one illustrative embodiment, the optical routing system (600) can comprise a number of elements including a waveguide array (202) and electrode array (520), a number of helical or cylindrical resonators (604) sandwiched between the waveguide array and the electrode array (520), and address lines (502). As discussed previously the address lines may be include column lines (505) and row lines (510). Electrical signals can be passed along these row and column lines (505, 510) to address individual elements within with the electrode array (520).

According to one exemplary embodiment, the electrode array (520) is comprised of a number of P-doped and N-doped electrodes (605, 610). In one embodiment, the P-doped electrodes (605) and N-doped electrodes (610) are in electrical contact with the perimeter of a cylindrical or helical resonator (604). A voltage is applied across the electrode pairs which injects charge carriers into the resonator (604). As discussed previously, this alters the index of refraction of the resonator (604). When the resonant frequency of the resonator (604) is tuned to an optical frequency contained within the underlying waveguide (105) light is coupled into or out of the resonator (604).

FIG. 6B shows an alternative electrode embodiment which utilizes a number of row lines (620) which are attached to an array of the N-doped electrodes (625). Rather than using separate P-doped electrodes, the core (630) of the cylindrical or helical resonator (615) is P-doped and serves as both the row line and the P-doped electrode. This reduces the number of individual elements in the optical routing system.

Figure 7A:
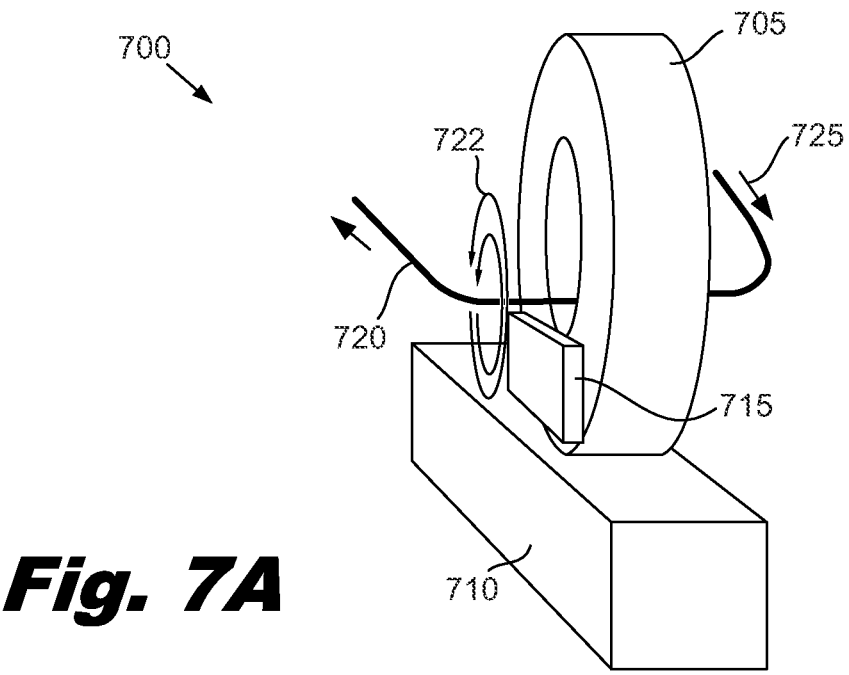
FIGS. 7A and 7B are diagrams showing an optical routing system operating on magneto-optic principles, according to one embodiment of principles described herein.
Figure 7B:
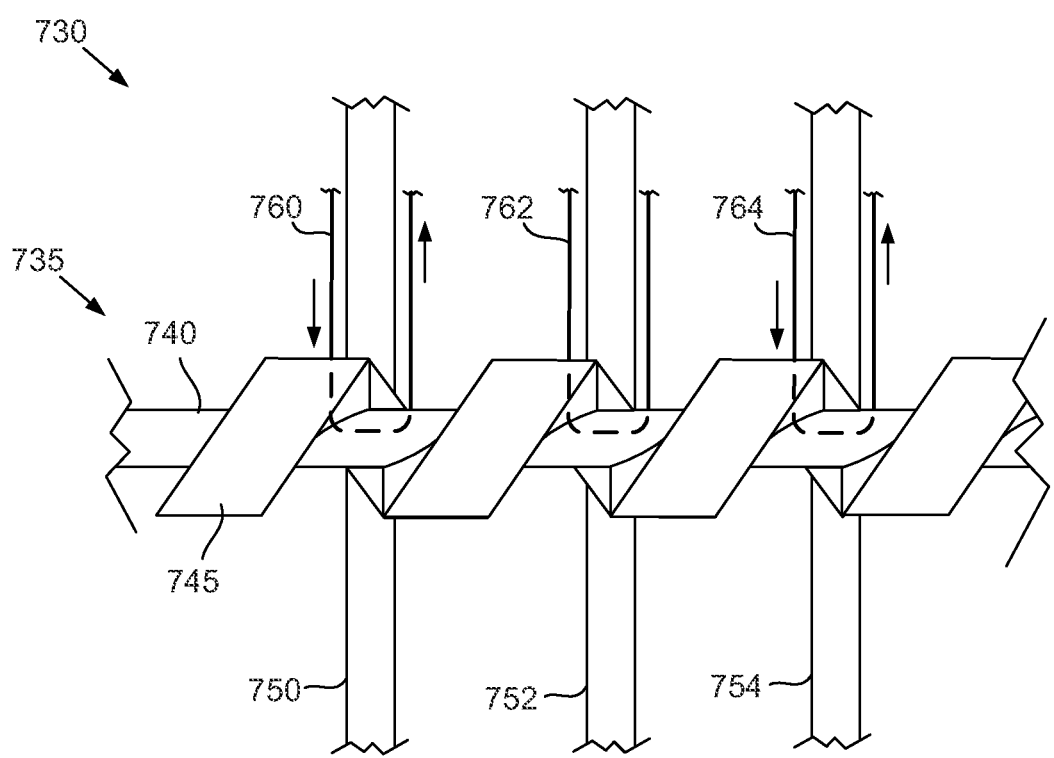

FIGS. 7A and 7B show an alternative method of controlling the interfaces between a cylindrical resonator and a tangential waveguide. FIG. 7A is a diagram showing a magneto-optical apparatus (700) for controlling the optical coupling between a cylindrical resonator (705) and a tangential waveguide (710). In this illustrative method, the cylindrical resonator (705), or portions thereof, is doped with impurities that change the optical characteristics of the cylindrical resonator (705) in the presence of a magnetic field (722). By way of example and not limitation, the doping impurity may be paramagnetic terbium (Tb). The application of an external magnetic field (722) orders the magnetic moments on the terbium impurities, thereby producing a phase shift in the optical energy propagating through the cylindrical resonator (705). The resonant frequencies of the cylindrical resonator (705) are consequently tuned in proportion to this phase shift. As previously discussed, the resonant frequency of the cylindrical resonator (705) should be mode-matched to optical energy traveling through the tangential waveguide (710) for the optical energy to be coupled across the interface.

The external magnetic field (722) may be created by a variety of methods. By way of example and not limitation, the external magnetic field may be created by passing current (725) through an electrical conductor (720) that is in proximity to the doped cylindrical resonator (705). In one illustrative embodiment, the electrical conductor (720) passes through the center portion of the cylindrical resonator (705). As current (725) is passed through the electrical so conductor (720) from right to left as shown in the diagram, a magnetic field (722) is generated in a first orientation. This orientation of the magnetic field (722) generates an optical phase shift within the doped cylindrical resonator (705).

Varying the amount of current (725) passing through the electrical conductor (720) changes the magnitude of the magnetic field (722), which varies the magnitude of the phase shift within the cylindrical resonator (705). Consequently, by varying the amount of current (725) passing through the electrical conductor (720), the resonant frequency of the cylindrical resonator (705) can be tuned to couple the desired wavelengths of light into the cylindrical resonator (705). Additional flexibility in tuning the cylindrical resonator can be obtained by reversing the direction of the current (725) within the electrical conductor (722), which reverses the polarity of the magnetic field (722) and the resulting optical phase shift.

According to one exemplary embodiment, the magnetic field (722) generated by the current (725) can be manipulated by attaching a ferromagnetic material (832, FIG. 8A) in proximity to the cylindrical resonator (705 and 802, 804 in FIG.

8A). According to one exemplary embodiment, the ferromagnetic material is a permalloy patch (715 and 834, 830 in FIG. 8A) which is attached to the side of the cylindrical resonator (705). Permalloy is a nickel-iron magnetic alloy with high magnetic permeability (high degree of magnetism in presence of an applied magnetic field) and low coercivity (low residual magnetism when the applied magnetic field is removed). The stray magnetic field from permalloy patch (715) amplifies/concentrates the magnetic field (722) in the desired location (808, FIG. 8A). The permalloy patch (715) reduces the amount of current required to tune the cylindrical resonator to a given resonant frequency. Additionally, in some embodiments, the permalloy patch may increase the range of frequencies over which the cylindrical resonator may be tuned.

FIG. 7B is a diagram showing one illustrative embodiment for controlling a plurality of interfaces between a helical resonator (735) and various waveguides (750, 752, 754). In this embodiment, individually addressable electrical conductors (760, 762, 764) are threaded through the center portion of the helical resonator (735). To create a passageway through the center portion of the helical resonator (735), part of the supporting core (740) may be removed, leaving the helix (745) undisturbed. As discussed previously, a complementary grid of control wires can be used address the electrical conductors (760, 762, 764). A variety of conductor configurations may be used to generate the desired magnetic field. By way of example and not limitation, an electrical conductor may be wrapped multiple times around the cylindrical resonator or shaped into a coil that is brought into proximity with an optical interface. Additionally, permalloy patches or other ferromagnetic material may be incorporated into the design to assist in shaping the resulting magnetic fields.

In addition to the methods described above for coupling and decoupling cylindrical resonator to tangential waveguides, a variety of other methods could be used. By way of example and not limitation, various electro-optic effects could be used. For example, changes in the refractive index of the cylindrical resonator material could be made using the Pockels effect (in which the refractive index of certain crystalline solids varies linearly in portion to an applied electrical field) or the Kerr effect (the change in refractive index proportional to the square of the electrical field). Changes in absorption can also have a strong effect on the refractive index for wavelengths near the absorption edge of the optical material. Changes in absorption can be induced using the Franz-Keldysh effect, the Stark effect, the Quantum-confined Stark effect, or various other electro-absorption or electro-chromatic effects.

Figure 8A:
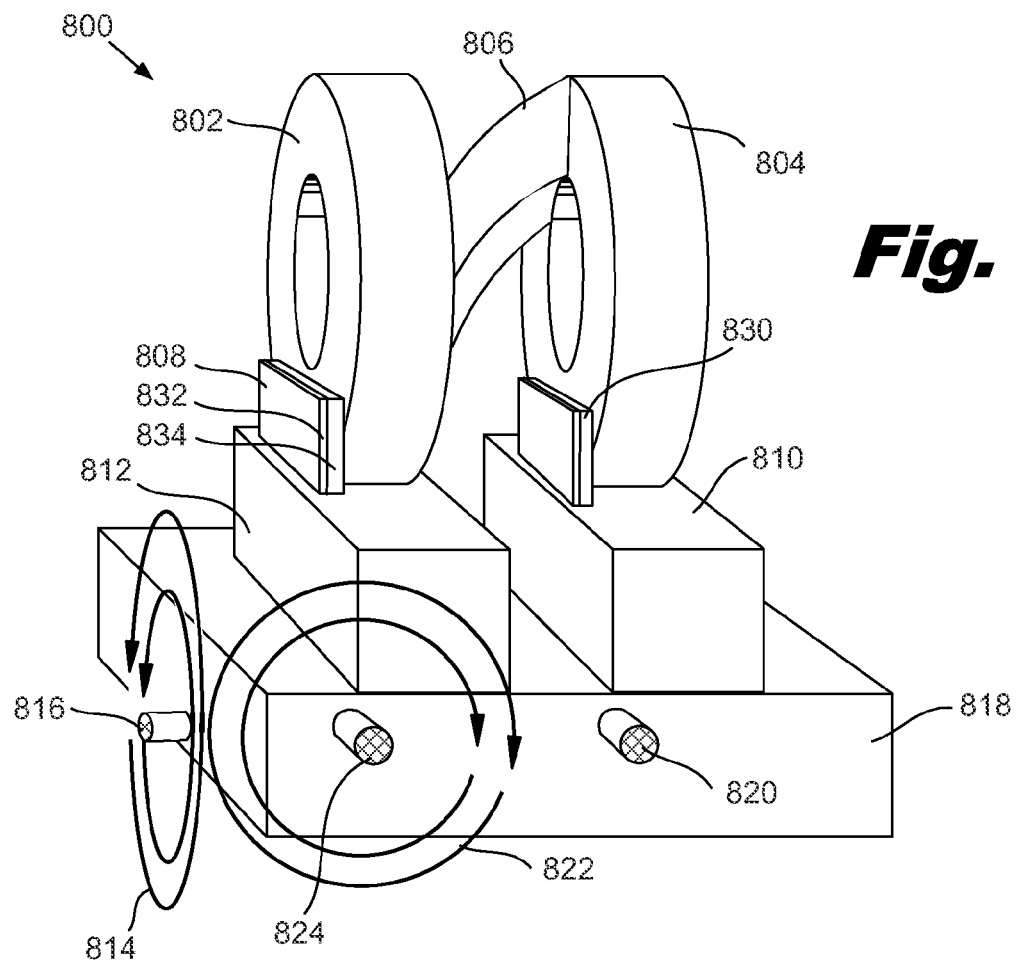
FIGS. 8A and 8B are diagrams showing an optical routing system operating on magneto-optic principles, according to one embodiment of principles described herein.
Figure 8B:
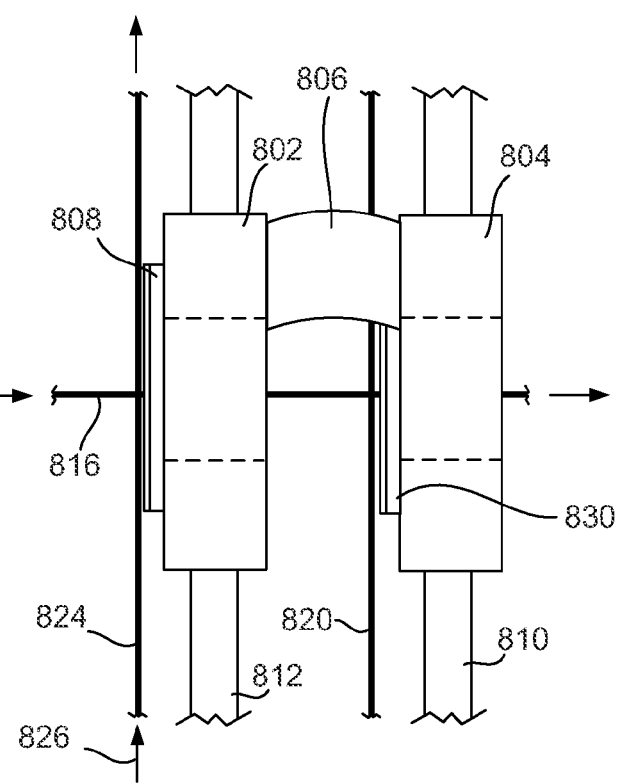

FIGS. 8A and 8B show an alternative apparatus and method for controlling the interfaces between a cylindrical resonator and a tangential waveguide. FIG. 8A is a diagram showing a partially cut-away cross-section of a magneto-optical apparatus (800). FIG. 8B is a top view of the same apparatus (800). The magneto-optical apparatus (800) includes a base (818) upon which a plurality of ridge waveguides (810, 812) are formed. Above each of the ridge waveguides (810, 812) a ring resonator (802, 804) is placed. Between adjacent ridge waveguides, a bridging element (806) makes a direct optical connection between the two ring resonators (802, 804).

For clarity of illustration, only a small section of the magneto-optical apparatus (800) is illustrated. There may be a large number of ridge waveguides in an array formed on a substrate with a corresponding number of ring resonators chained together by bridging elements. The bridging elements are configured to make a direct transmissive optical coupling between two adjacent waveguides. The bridging elements may take a variety of forms, including sections of a helix, torpid, cylinder, and other geometries. This configuration of ring resonators connected by bridging elements could be used in a variety of designs and applications. For example, the ring resonators connected by bridging elements could replace the cylindrical resonators illustrated in FIG. 1 and FIG. 2 or the helical resonators illustrated in FIGS. 3-5. Additionally, the ring resonators connected by bridging elements could utilize any of the various electrode, addressing, or coupling configurations described with respect to other illustrative embodiments.

As was previously described, optical energy can be coupled out of the ridge waveguides (810, 812) and into the ring resonators (802, 804). In the embodiment illustrated in FIGS. 8A and 8B, the ring resonators have been doped with impurities, such as paramagnetic terbium, that change the optical characteristics of the cylindrical resonator in the presence of a magnetic field. The application of an external magnetic field (814, 822) orders the magnetic moments on the terbium impurities, thereby producing a phase shift in the optical energy propagating through the cylindrical resonators (802, 804). The resonant frequencies of the ring resonators (802, 804) are tuned in proportion to this phase shift to selectively couple and decouple a given ring resonator from a waveguide.

According to one exemplary embodiment, the various interfaces between ring resonators and ridge waveguides can be address by embedding a grid of conductors in the base (818). For example, a series of parallel conductors (820, 824) may pass through the upper portion of the base (818). These conductors (820, 824) form the columns of the grid. A perpendicular series of parallel conductors (816) may pass through a lower portion of the base (818) to form the rows of the grid. To address a particular interface, a current (826, 828) is passed through appropriate column (824) and row (816). At the junction between the selected row and the selected column, the magnetic flux is concentrated to produce the desired coupling or decoupling effect on the target interface.

Figure 9:
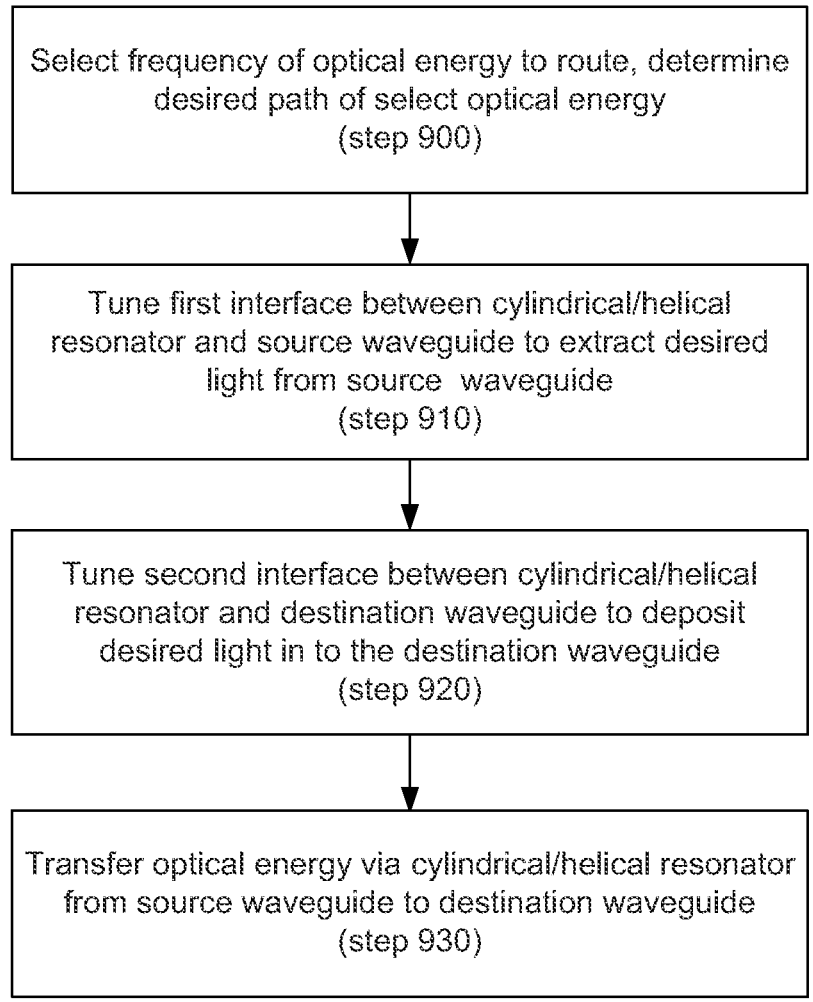
FIG. 9 is an illustrative flowchart showing one method for utilizing an optical routing system to direct optical energy from a source waveguide into a destination waveguide, according to one embodiment of principles described herein.

FIG. 9 is an illustrative flowchart showing one method for utilizing an optical routing system to direct optical energy from a source waveguide into a destination waveguide. In a first step, the desired operation is defined (step 900). This may include selecting the frequency and location of the optical energy to be manipulated and the desired path the selected optical energy is to follow. A first node or interface is tuned to extract the optical energy from the source waveguide and into the helical or cylindrical resonator (step 910). A second interface is tuned to deposit the optical energy from the helical or cylindrical resonator into a destination waveguide (920). The optical energy is then transferred via the helical or cylindrical resonator from the source waveguide to the destination waveguide (930).

In sum, cylindrical resonators are placed across a waveguide array. By shifting the resonant frequency of portions of the resonator, the evanescent light propagating through the waveguides can be selectively coupled into the resonator. The resonant frequency of the resonator can be controlled in a number of ways, including charge carrier scattering, opto-electric, and opto-magnetic means. The light is extracted from the resonator at the interface between the cylindrical resonator and the desired target waveguide by selectively tuning a proximal portion of the resonator. In one illustrative embodiment, the optical routing system is configured to route an optical signal from any waveguide within the waveguide array to any other waveguide within the array. The compact nature of this optical routing system results in a significant savings of chip or system real estate.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system for routing optical signals comprising:
 a waveguide array comprising a source waveguide and a destination waveguide;
 a cylindrical resonator, said cylindrical resonator lying across said source waveguide and said destination waveguide, said cylindrical resonator having separate tangential interfaces with each of said source waveguide and said destination waveguide;
 said separate tangential interfaces being independently controllable such that optical signals can be selectively coupled into said cylindrical resonator from said source waveguide and selectively coupled from said cylindrical resonator into said destination waveguide.

2. The system of claim 1, wherein said waveguide array comprises a plurality of waveguides, said system being configured to route an optical signal from any one of said plurality of waveguides into any other of said plurality of waveguides.

3. The system of claim 1, wherein said separate tangential interfaces are electrically controlled by one of: charge carrier injection and a magneto-optic effect.

4. The system of claim 3, further comprising a first electrode and a second electrode; said first electrode and said second electrode being in electrical contact with said cylindrical resonator, a voltage difference being placed across said first electrode and said second electrode such that charge carriers are injected into said cylindrical resonator.

5. The system of claim 4, wherein said waveguide array comprises a plurality of waveguides, said system being configured to route an optical signal from any one of said plurality of waveguides into any other of said plurality of waveguides, and wherein said first electrode and said second electrode are interposed in gaps between said plurality of waveguides.

6. The system of claim 4, wherein said cylindrical resonator comprises a core, said core, comprising said first electrode; said second electrode contacting an outer perimeter of said cylindrical resonator.

7. The system of claim 3, wherein said separate tangential interfaces are electrically controlled by said magneto-optic effect, said magneto-optic effect being implemented by doping said cylindrical resonator with an impurity element; said impurity element changing an optical characteristic of said cylindrical resonator in response to an applied magnetic field.

8. The system of claim 7, wherein said applied magnetic field is generated by passing an electrical current through a conductor; said conductor being in proximity to said cylindrical resonator and a ferromagnetic patch.

9. The system of claim 1, wherein said cylindrical resonator is a helical resonator, said helical resonator comprising a core and a helix, said core passing axially through a center of said helix and being conjoined with said helix.

10. The system of claim 9, wherein said system comprises a plurality of helical resonators, a first portion of said helical resonators comprising left-hand helical resonators and second portion of said helical resonators comprising right-hand helical resonators.

11. The system of claim 1, wherein said cylindrical resonator is a circular right cylinder, said circular right cylinder having a length and a diameter, said length being substantially greater than said diameter.

12. The system of claim 1, wherein said waveguide array comprises a plurality of waveguides transmitting multiple frequencies of optical energy, said cylindrical resonator being configured to simultaneously route a first optical frequency from a first waveguide into a second waveguide and route a second optical frequency from a third waveguide into a fourth waveguide.

13. A system for routing optical signals comprising:
 a waveguide array, said waveguide array comprising a plurality of ridge waveguides;
 a cylindrical resonator, the axis of said cylindrical resonator being perpendicular to the length of said plurality of ridge waveguides and said cylindrical resonator lying across said plurality of ridge waveguides; said cylindrical resonator having a separate tangential interface with each of said plurality of ridge waveguides, each said tangential interface being electrically controllable such that optical energy can be selectively coupled into said cylindrical resonator from any one of said plurality of said ridge waveguides and selectively coupled out of said cylindrical resonator to one or more destination ridge waveguides; and
 a plurality of electrode pairs, said electrode pairs being electrically addressable such that each said tangential interface can be controlled individually.

14. A method of selectively routing an optical signal between waveguides comprising:
 selecting an optical signal to route;
 determining a desired path for said optical signal;
 with a cylindrical resonator crossing a source waveguide and a destination waveguide, tuning a first controllable tangential interface between said cylindrical resonator and said source waveguide to extract said optical signal from said source waveguide;
 tuning a second independently controllable tangential interface between said cylindrical resonator and said destination waveguide to deposit said optical signal into said destination waveguide; and
 transferring said optical signal from said source waveguide to said destination waveguide through said cylindrical resonator.

15. The method of claim 14, wherein one or more cylindrical resonators are configured to form controllable interfaces between a plurality of waveguides contained within one or more waveguide arrays, said method further comprising simultaneously routing one or more optical signals out of one or more of said plurality of waveguides and through said cylindrical resonators into two or more of said plurality of waveguides.

16. The system of claim 13, wherein said waveguide array comprises a plurality of waveguides, said system being configured to route an optical signal from any one of said plurality of waveguides into any other of said plurality of waveguides.

17. The system of claim 13, wherein said separate tangential interfaces are electrically controlled by one of: charge carrier injection and a magneto-optic effect.

18. The system of claim 17, further comprising a first electrode and a second electrode; said first electrode and said second electrode being in electrical contact with said cylindrical resonator, a voltage difference being placed across said first electrode and said second electrode such that charge carriers are injected into said cylindrical resonator.

19. The system of claim 18, wherein said waveguide array comprises a plurality of waveguides, said system being configured to route an optical signal from any one of said plurality of waveguides into any other of said plurality of waveguides, and wherein said first electrode and said second electrode are interposed in gaps between said plurality of waveguides.

20. The system of claim 13, wherein said cylindrical resonator is a helical resonator, said helical resonator comprising a core and a helix, said core passing axially through a center of said helix and being conjoined with said helix.

* * * * *